United States Patent
Murate et al.

(10) Patent No.: US 9,188,032 B2
(45) Date of Patent: Nov. 17, 2015

(54) BLOWBY GAS HANDLING ASSEMBLY FOR INTERNAL COMBUSTION ENGINE

(71) Applicant: Toyota Jidosha Kabushiki Kaisha, Toyota, Aichi-ken (JP)

(72) Inventors: Nobuyuki Murate, Okazaki (JP); Shinichi Mitani, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/332,895

(22) Filed: Jul. 16, 2014

(65) Prior Publication Data

US 2015/0034057 A1    Feb. 5, 2015

(30) Foreign Application Priority Data

Aug. 2, 2013    (JP) .................. 2013-161795

(51) Int. Cl.
- *F01M 13/02* (2006.01)
- *F02M 35/10* (2006.01)
- *F02D 41/14* (2006.01)
- *F02D 41/00* (2006.01)

(52) U.S. Cl.
CPC ......... *F01M 13/022* (2013.01); *F02D 41/0002* (2013.01); *F02D 41/0025* (2013.01); *F02D 41/1441* (2013.01); *F02D 41/1454* (2013.01); *F02M 35/10222* (2013.01); *F01M 13/023* (2013.01); *F01M 13/028* (2013.01); *F02D 2250/08* (2013.01)

(58) Field of Classification Search
CPC .............. F01M 13/022; F01M 13/023; F01M 35/10222; F01M 35/10209; F01M 2013/0077; F01M 2013/0083; F01M 2013/0094; F01M 2013/0038; F01M 2013/0044; F02D 45/00; F02D 2250/06; F02D 2009/0223; F02D 2009/0225; F02D 2250/08
USPC .......................... 123/572, 574, 41.86, 184.22
See application file for complete search history.

(56) References Cited

U.S. PATENT DOCUMENTS

| | | | |
|---|---|---|---|
| 4,991,559 A * | 2/1991 | Osawa et al. .................. | 123/682 |
| 7,891,346 B2 * | 2/2011 | Asanuma et al. ............. | 123/572 |
| 8,145,406 B2 * | 3/2012 | Satou ............................. | 701/103 |
| 8,161,952 B2 * | 4/2012 | Satou ............................. | 123/572 |
| 8,353,276 B2 * | 1/2013 | Lewis et al. ................... | 123/572 |

(Continued)

FOREIGN PATENT DOCUMENTS

| | | | | |
|---|---|---|---|---|
| JP | 2004060475 A | * | 2/2004 | ............ F01M 13/00 |
| JP | 2009103104 A | * | 5/2009 | |

(Continued)

*Primary Examiner* — Lindsay Low
*Assistant Examiner* — Grant Moubry
(74) *Attorney, Agent, or Firm* — Dinsmore & Shohl LLP

(57) ABSTRACT

An engine includes: a first part that is provided in a first passage that interconnects an inside of a crankcase and a part of an intake passage at a downstream side of an adjustment part adjusting an intake air amount and changes gas flow in the first passage; and a second part that is provided in a second passage that interconnects the inside of the crankcase and a part of the intake passage located at an upstream side of the adjustment part and changes gas flow in the second passage. If an engine temperature is higher than a given value, and the degree of fuel decreasing correction exceeds a given value, the first part decreases the gas flow rate through the first passage and the second part restricts a flow direction in the second passage to a direction in which gas flows to the crankcase from the intake passage.

6 Claims, 3 Drawing Sheets

(56) References Cited

U.S. PATENT DOCUMENTS

| | | |
|---|---|---|
| 8,505,518 B2 * | 8/2013 | Mallebrein et al. ............ 123/572 |
| 2001/0022175 A1 * | 9/2001 | Moren ............................ 123/572 |
| 2008/0110443 A1 * | 5/2008 | Hirano ........................... 123/572 |
| 2009/0211545 A1 * | 8/2009 | Satou ......................... 123/41.86 |

FOREIGN PATENT DOCUMENTS

| | | |
|---|---|---|
| JP | 2010-090870 A | 4/2010 |
| JP | 2010-209843 A | 9/2010 |

* cited by examiner

BLOWBY GAS HANDLING ASSEMBLY FOR INTERNAL COMBUSTION ENGINE

CROSS-REFERENCE TO RELATED APPLICATION

This application is based upon and claims the benefit of priority of the prior Japanese Patent Application No. 2013-161795, filed on Aug. 2, 2013, the entire contents of which are incorporated herein by reference.

FIELD OF THE INVENTION

The present invention relates to internal combustion engines.

BACKGROUND

There is known an internal combustion engine in which blowby gas that leaks from a combustion chamber is introduced into an intake passage (see Japanese Laid-Open Patent Publication Nos. 2010-209843 and 2010-90870).

The internal combustion engines may have a situation in which fuel that adheres to a wall of the combustion chamber under cold engine conditions is mixed with oil and is vaporized under engine warmed-up conditions, whereby a large amount of fuel is included in the blowby gas. Specifically, in an internal combustion engine capable of using an alcohol mixed fuel, since the alcohol component of fuel included in oil is abruptly vaporized at the boiling point (approximately 78° C. for ethanol, and approximately 65° C. for methanol), a large amount of fuel is likely to be included in the blowby gas. Since the fuel component is included in the blowby gas in this way, the blowby gas may include fuel as much as an amount that makes it impossible to control the air/fuel ratio within an appropriate range by a feedback control that corrects the amount of fuel injection.

In this case, the air/fuel ratio may be adjusted by reducing the flow rate of the blowby gas by a valve that is provided in a passage through which the blowby gas is introduced to an intake passage from a crankcase, for example. In the introduction of the blowby gas into the intake passage from the crankcase, fresh air as much as the blowby gas introduced into the intake passage can be introduced into the crankcase from the intake passage through another passage.

However, in the case where a large amount of fuel is included in the blowby gas, the pressure in the crankcase is raised due to the pressure of the vaporized fuel. Thus, in this case, even when the flow rate of the blowby gas is reduced by the above valve, blowby gas may be introduced into the intake passage from the crankcase through the passage that is originally used to introduce fresh air into the crankcase from the intake passage. As a result, even when the flow rate of the blowby gas is reduced by the above valve, there is a possibility that the air/fuel ratio is not adjusted.

SUMMARY OF THE INVENTION

According to an aspect of the present invention, there is provided an internal combustion engine capable of adjusting the air/fuel ratio even if a large amount of fuel is included in the blowby gas.

According to another aspect of the present invention, there is provided an internal combustion engine including: a first flow change part that is provided in a first passage that interconnects an inside of a crankcase and a part of an intake passage located at a downstream side of an intake air amount adjustment part capable of adjusting an intake air amount and changes gas flow in the first passage; and a second flow change part that is provided in a second passage that interconnects the inside of the crankcase and a part of the intake passage located at an upstream side of the intake air amount adjustment part and changes gas flow in the second passage, wherein if an engine temperature is higher than a given value, and the degree of fuel decreasing correction by a feedback control that controls a fuel injection amount exceeds a given degree, the first flow change part decreases the flow rate of gas passing through the first passage and the second flow change part restricts a gas flow direction in the second passage to a direction in which gas flows to the inside of the crankcase from the intake passage.

DETAILED DESCRIPTION

A description is given of embodiments of the invention in conjunction with the drawings.

Figure 1:
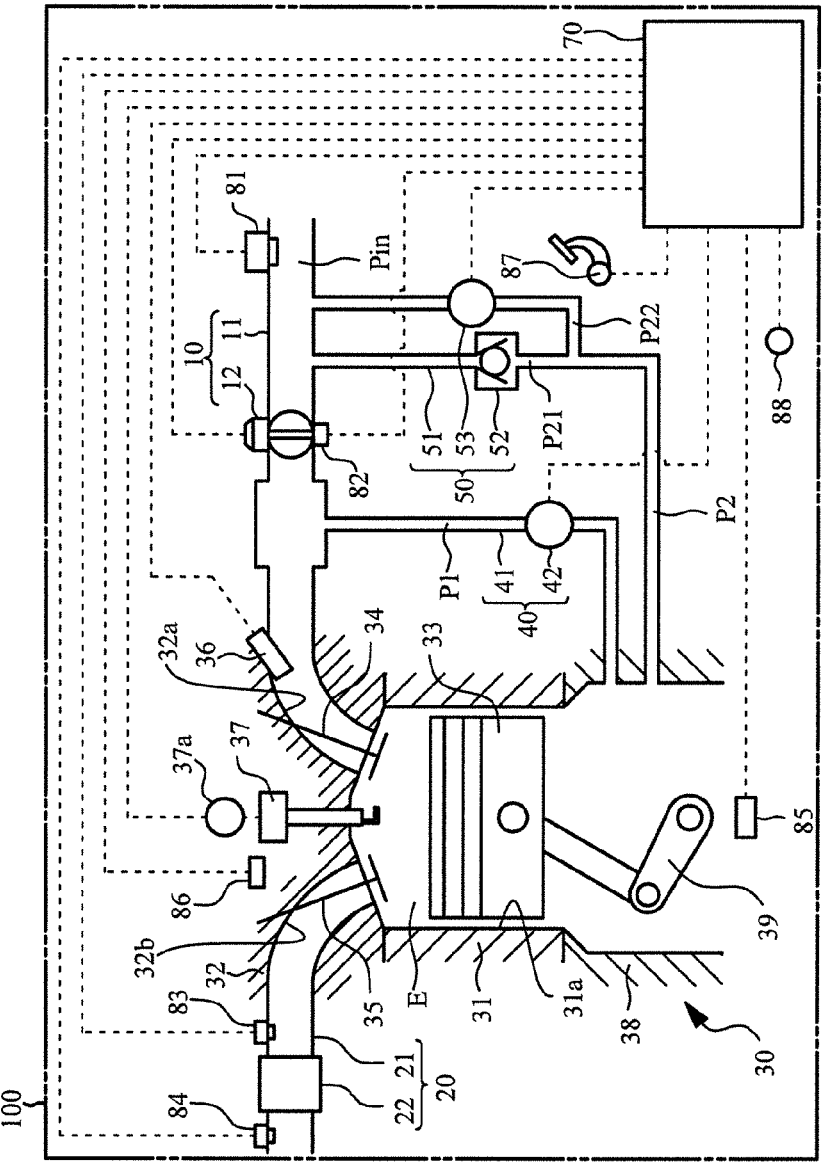
FIG. 1 is a schematic diagram of an internal combustion engine.

FIG. 1 is a schematic diagram of an internal combustion engine 100. The internal combustion engine 100 has an intake system 10, an exhaust system 20, a main body 30, a first device 40, a second device 50 and an ECU 70. The internal combustion engine 100 is an internal combustion engine having multiple cylinders, and is mounted in an engine, which is not illustrated. The internal combustion engine 100 may be an internal combustion engine capable of using an alcohol mixed fuel. In FIG. 1, the main body 30 is illustrated in association with only one of the cylinders.

The intake system 10 has an intake pipe 11 and a throttle valve 12. The intake pipe 11 forms an intake passage Pin. The throttle valve 12 is an intake air amount adjustment part capable of adjusting the amount of intake air, and is attached to the intake pipe 11. For example, the throttle valve 12 is an electronic control type throttle mechanism. The throttle valve 12 may be a mechanical type throttle mechanism. The intake pipe 11 has branch connections to the respective cylinders of the main body 30 at the downstream side of the throttle valve 12. The intake system 10 is equipped with an airflow meter 81 and a throttle position sensor 82. The airflow meter 81 is attached to a part of the intake pipe 11 at the upstream side of the throttle valve 12, and measures the amount of intake air. The throttle position sensor 82 is attached to the throttle valve 12, and detects the opening angle of the throttle valve 12.

The exhaust system 20 has an exhaust pipe 21 and a catalyst 22. The exhaust pipe 21 forms an exhaust passage. The catalyst 22 is attached to the exhaust pipe 21, and purifies exhaust gas. The exhaust pipe 21 has branch connections to the respective cylinders of the main body 30 at the upstream side of the catalyst 22. The exhaust system 20 is provided with an A/F sensor 83 and an $O_2$ sensor 84. More specifically, the A/F sensor 83 is attached to a part of the exhaust pipe 21 that is located at the upstream side of the catalyst 22 and is lower than the uniting of branch pipes from the respective cylinders, and linearly detects the air/fuel ratio on the basis of the concentration of oxygen included in the exhaust gas. More specifically, the $O_2$ sensor is attached to a part of the exhaust pipe at the downstream side of the catalyst 22 and detects whether the air/fuel ratio is rich or lean with respect to the stoichiometric air/fuel ratio on the basis of the concentration of oxygen in the exhaust gas.

The main body 30 has a cylinder block 31, a cylinder head 32, a piston 33, an intake valve 34, an exhaust valve 35, a fuel injection valve 36, an ignition plug 37, a crankcase 38, and a crankshaft 39. A cylinder 31a is formed in the cylinder block 31. The piston 33 is accommodated in the cylinder 31a. The piston 33 is adjacent to a combustion chamber E. The combustion chamber E is a space surrounded by the cylinder block 31, the cylinder head 32 and the piston 33.

The cylinder head 32 is fixed to the upper surface of the cylinder block 31. In the cylinder head 32, formed are an intake port 32a that introduces air in the combustion chamber E, and an exhaust port 32b that exhausts gas from the combustion chamber E. The intake valve 34 opens and closes the intake port 32a, and the exhaust valve 35 opens and closes the exhaust port 32b. The intake valve 34 and the exhaust valve 35 are provided with regard to the combustion chamber E. For cylinder, the main body 30 is provided with multiple intake ports 32a and multiple intake valves 34 and with multiple exhaust ports 32b and multiple exhaust valves 35.

The fuel injection valve 36 is attached to the cylinder head 32. The fuel injection valve 36 injects fuel into the intake passage Pin formed by the intake port 32a. The fuel injection valve 36 may be a fuel injection valve that injects fuel into the combustion chamber E. The ignition plug 37 is attached to the cylinder head 32 in a state in which an electrode protrudes into an upper center of the combustion chamber E. A crankcase 38 is fixed to the cylinder block 31. The crankcase 38 accommodates a crank part of the crankshaft 39. The crankshaft 39 converts reciprocating motion of the piston 33 to rotational motion. The main body 30 is equipped with a crank angle sensor 85 for detecting the angle of the crankshaft 39, and a water temperature sensor 86 that senses a cooling water temperature THW.

The first device 40 is a PCV device and introduces blowby gas into the intake passage Pin. The first device 40 has a pipe 41 and a valve 42. The pipe 41 forms the first passage P1. The first passage P1 interconnects the inside of the crankcase 38 and a part of the intake passage Pin at the downstream side of the throttle valve 12. The above part is a negative pressure generating part. The first passage P1 may be formed so as to be connected to the intake passage P1 via the cylinder block 31 or the cylinder head 32, for example. The valve 42 changes the flow of gas in the first passage P1. The valve 42 is a flow rate adjustment valve capable of changing the flow rate of gas that flows through the first passage P1. The valve 42 corresponds to a flow change part.

The second device 50 is a PCV and air introduction device, and introduces fresh air into the crankcase 38 or introduces blowby gas into the intake passage Pin. For example, the second device 50 is capable of functioning as an air introduction device when the throttle valve 12 is at a small opening angle. For example, the second device 50 is capable of functioning as a PCV device when the throttle valve 12 is fully opened.

The second device 50 has a pipe 51, a check valve 52 and a valve 53. The pipe 51 forms the second passage P2. The second passage P2 interconnects the inside of the crankcase 38 and a part of the intake passage Pin at the upstream side of the throttle valve 12. More specifically, the pipe 51 has branch connections to the intake pipe 11. Thus, the second passage P2 has branch passages P21 and P22 respectively connected to the intake passage Pin. The branch passage P21 corresponds to a first branch passage, and the branch passage P22 corresponds to a second branch passage.

The check valve 52 is provided in the branch passage P21. The check valve 52 allows the gas to flow in the inside of the crankcase 38 from the intake passage Pin and inhibits the gas from flowing in the intake passage Pin from the inside of the crankcase 38. The valve 53 is provided in the branch passage P22. The valve 53 is a flow rate adjustment valve capable of changing the flow rate of the gas that flows through the branch passage P22. The check valve 52 and the valve 53 change the flow of the gas in the second passage P2. The check valve 52 and the valve 53 correspond to a flow change part.

The ECU 70 is an electronic control device to which the throttle valve 12, the fuel injection valve 36, an igniter 37a for the ignition plug 37 and the valves 42 and 53 are electrically connected as control objects. Further, as a kind of sensors and switches, the airflow meter 81, the throttle position sensor 82, the A/F sensor 83, the $O_2$ sensor 84, the crank angle sensor 85 and the water temperature sensor 86 are electrically connected to the ECU 70. Furthermore, an accelerator opening angle sensor 87 that senses the amount of depression of an accelerator pedal, and an alcohol sensor 88 that detects the percentage of the alcohol content in fuel are electrically connected to the ECU 70 as the kind of sensors and switches.

In the ECU 70, a CPU executes processes on the basis of programs stored in a ROM while utilizing a temporary memory area in a RAM as necessary, whereby a feedback control part (hereinafter referred to as FB) and a control part, for example, are implemented. These configurations may be implemented by multiple electronic control devices.

The FB control part adjusts the air/fuel ratio by performing a FB control that corrects the fuel injection amount on the basis of the outputs of the A/F sensor 83 and the $O_2$ sensor 84. More specifically, the FB control calculates a fuel correction ratio on the basis of the outputs of the A/F sensor 83 and the $O_2$ sensor 84, and corrects the fuel injection amount to increase or decrease by the calculated fuel correction ratio. When the fuel injection amount is corrected to decrease, the fuel correction ratio has a negative value. Thus, in the correction of decreasing the fuel injection amount, the degree of fuel decreasing correction is larger as the fuel injection ratio is smaller.

The control part controls the valves 42 and 53. The control part carries out a first control in a case where the engine temperature is higher than a given value α (here in a case where it is equal to or higher than the given value α) and the degree of fuel decreasing correction in the FB control exceeds a given degree β (here in a case where it is equal to or larger than the given degree β). The first control controls the valve 42 to decrease the flow rate of the gas that flows through the first passage P1, and controls the valve 53 to restrict the gas flow in the second passage P2 to a direction in which gas flows from the intake passage Pin to the inside of the crankcase 38 (hereinafter, referred to as air introducing direction). Thus, in the above case, the valve 42 reduces the flow rate of gas. Further, in this case, the valve 53 restricts the gas flowing direction to the air introducing direction.

In the restriction of the gas flowing direction to the air introducing direction, the control part fully closes the valve 53. Thus, the valve 53 is fully closed in such a case. If the degree of the fuel decreasing correction is larger than a given degree γ by the FB control after the execution of the first control, the control part continuously performs the first control. The given angle γ is set smaller than the given angle β. The first control is capable of controlling the valve 42 to set a smaller flow rate of the gas flowing through the first passage P1 than that for the case where the degree of the fuel decreasing correction does not exceed the given degree β.

When the engine temperature is lower than the given value α or when the degree of the fuel decreasing correction by the FB control does not exceed the given degree β, the control part carries out the second control. The control part carries out the second control also, in a case where the degree of the fuel decreasing correction by the FB control becomes smaller than the given degree γ (here in a case where it becomes equal to or smaller than the given degree γ). The control part carries out the first control, and thereafter carries out the second control while stopping the first control.

The second control is different from the first control, and may include a control that allows the first control to be stopped. By stopping the first control, the valve 42 stops decreasing the flow rate of the gas, and the valve 53 stops restricting the gas flow direction. For example, a control of fully opening the valves 42 and 53 may be applied to the second control. Thus, the valves 42 and 53 are fully opened by stopping the first control, for example. The second control may be another control of adjusting the opening angles of the valves 42 and 53 in accordance with a given condition, for example. The first and second flow change parts may further include the control part.

Figure 2:
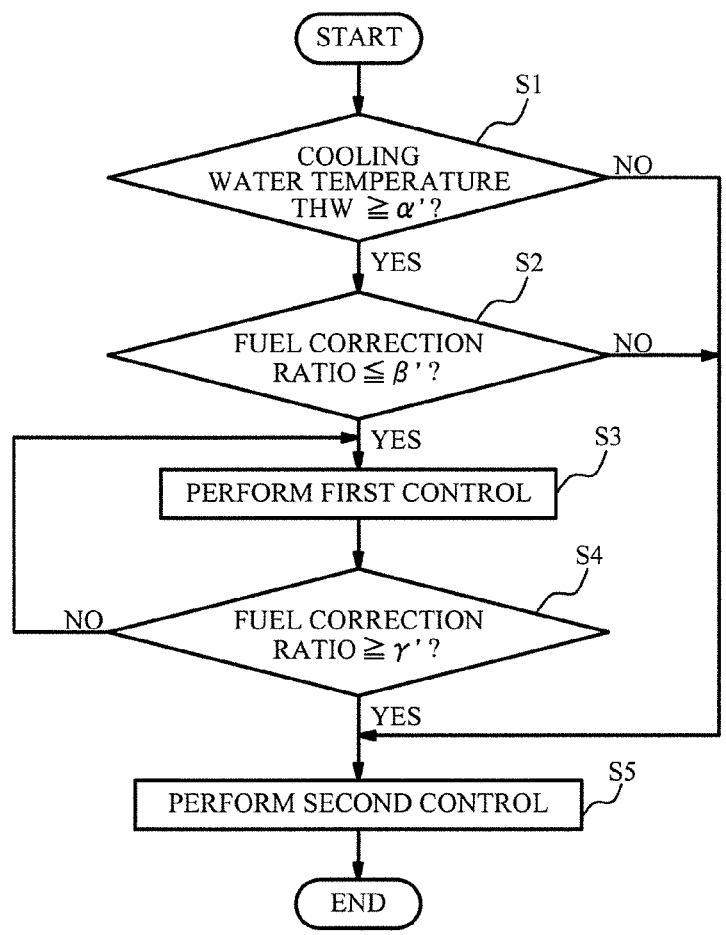
FIG. 2 is a flowchart of an example of a control operation.

Next, a description is given of an example of the control operation of the ECU 70 in conjunction with a flowchart of FIG. 2. The ECU 70 determines whether the cooling water temperature THW is equal to or higher than a given value α' (for example, 70° C.) (step S1). The given value α' is the cooling water temperature THW corresponding to the given value α, and at this step, it is determined whether the engine temperature is equal to or higher than the given value α. The determination as to whether the engine temperature is equal to or higher than the given value α may be made by determining whether the oil temperature THO is equal to or higher than a given value, for example. If the affirmative determination is made, the ECU 70 determines whether the fuel correction ratio by the FB control is smaller than or equal to a given value β' (for example, −40%) (step S2). The given value β' is a fuel correction ratio that corresponds to the given degree β, and at this step, it is determined whether the degree of the fuel decreasing correction is larger than or equal to the given degree β.

The FB control is capable of controlling the fuel injection amount to decrease by the fuel correction ratio if the fuel correction ratio is larger than or equal to the given value β'. In contrast, the FB control is no longer capable of correcting the fuel injection amount to decrease by the fuel correction ratio if the fuel correction ratio is smaller than or equal to the given value β'. That is, the air/fuel ratio is not controlled within the appropriate range. Thus, when the affirmative determination is made at step S2, the ECU 70 performs the first control (step S3). Thus, the valve 42 decreases the flow rate of the gas in the first passage P1, and the valve 53 restricts the gas flow direction in the second passage P2 to the air introducing direction.

Subsequent to step S3, the ECU 70 determines whether the fuel correction ratio of the FB control is larger than or equal to a given value γ' (for example, −10%) (step S4). The given value γ' is a fuel correction ratio corresponding to the given degree γ, and at this step, it is determined whether the degree of the fuel decreasing correction is smaller than or equal to the given degree γ. If the negative determination is made at step S4, the control operation returns to step S3. Thus, the first control is continuously carried out.

If the negative determination is made at step S1 or S2, or if the affirmative determination is made at step S4, the ECU 70 carries out the second control (step S5). If the affirmative determination is made at step S4, the first control is started when the degree of the fuel decreasing correction becomes equal to or larger than β, and is thereafter stopped when the degree of the fuel decreasing correction becomes equal to or smaller than the given degree γ. The concrete content of the second control carried out when the negative determination is made at step S1 or S2 may be different from that when the affirmative determination is made at step S4. The present flowchart ends after step S5.

Figure 3A:
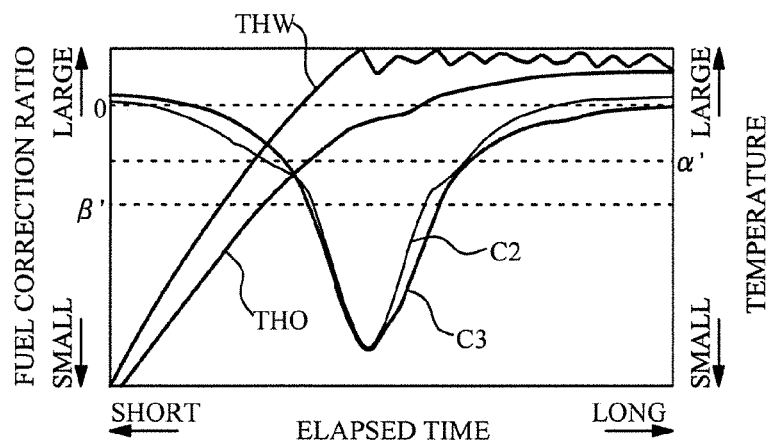
FIGS. 3A and 3B are diagrams that illustrate examples of changes of a fuel correction ratio.
Figure 3B:
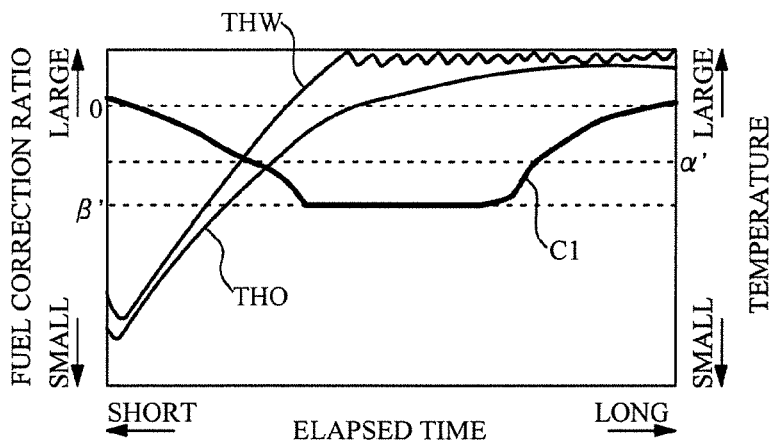

A description is now given of main functions and effects of the internal combustion engine 100. FIGS. 3A and 3B are diagrams of examples of changes of the fuel correction ratio observed as the time elapses. In FIGS. 3A and 3B, there are illustrated the cooling water temperature THW and the oil temperature THO along with the fuel correction ratio. FIG. 3B illustrates a case C1 where the internal combustion engine 100 is of interest, and FIG. 3A illustrates cases C2 and C3 where comparative examples are of interest. In the case C2, the first control is not carried out, and in the case C3, only the control of the valve 42 in the first control is carried out instead of the original first control.

As illustrated in FIG. 3A, in the case C2, the fuel correction ratio becomes equal to or smaller than the given value β' when the cooling water temperature THW is higher than the given value α'. Also, in the case C3, the fuel correction ratio becomes equal to or smaller than the given value β' when the cooling water temperature THW is higher than the given value α'. This is because the pressure of the inside of the crankcase 38 is raised by the pressure of vaporized fuel, whereby the blowby gas including a large amount of fuel is introduced into the intake passage Pin from the inside of the crankcase 38 through the second passage P2. Thus, in the cases C2 and C3, since the air/fuel ratio cannot be controlled within the appropriate range, exhaust emissions deteriorate.

In contrast, the internal combustion engine 100 performs the first control, and it is thus possible to prevent or restrain blowby gas including a large amount of fuel from being introduced into the intake passage Pin from the inside of the crankcase 38. Thus, as illustrated in FIG. 3B, in the case C1, the fuel correction ratio is prevented from further decreasing, so that the air/fuel ratio can be controlled within the appropriate range by the FB control. Thus, the internal combustion engine 100 is capable of adjusting the air/fuel ratio even if a large amount of fuel is included in the blowby gas. It is therefore possible to prevent or restrain deterioration of exhaust emissions.

According to a certain aspect, the internal combustion engine 100 are configured to have the second passage P2 having the branch passages P21 and P22 and to have the second flow change part composed of the check valve 52 and the valve 53. Further, the first flow change part has the valve 42. Thus, the internal combustion engine 100 configured as described above is capable of adjusting the air/fuel ratio even if a large amount of fuel is included in the blowby gas.

According to a certain aspect, the internal combustion engine 100 is configured to stop the first control in the case where the degree of the fuel decreasing correction by the FB control is smaller than the given degree γ after carrying out the first control. That is, the first control can be carried out by the internal combustion engine 100 configured as described above. According to a certain aspect, vaporization of fuel mixed in oil can be facilitated by the valves 42 and 53 configured to be fully opened in the above case. As a result, deterioration of oil can be prevented or restrained from progressing.

A large amount of fuel that is included in blowby gas leads to a situation such that the air/fuel ratio cannot be controlled within the appropriate range by the FB control. Thus, the internal combustion engine 100 is specifically suitable for an internal combustion engine capable of using an alcohol mixed fuel.

Although some embodiments of the present invention have been described in detail, the present invention is not limited to the specific embodiments but may be varied or changed within the scope of the present invention as claimed.

What is claimed is:

1. An internal combustion engine comprising:
    a first flow change part that is provided in a first passage that interconnects an inside of a crankcase and a part of an intake passage located at a downstream side of an intake air amount adjustment part adjusting an intake air amount and changes gas flow in the first passage;
    a second flow change part that is provided in a second passage that interconnects the inside of the crankcase and a part of the intake passage located at an upstream side of the intake air amount adjustment part and changes gas flow in the second passage; and
    an electronic control unit configured to:
    execute a feedback control that controls a fuel injection amount, and
    control the first flow change part to decrease a flow rate of gas passing through the first passage and control the second flow change part to restrict a gas flow direction in the second passage to a direction in which gas flows to the inside of the crankcase from the intake passage, when an engine temperature is higher than a given value and a degree of fuel decreasing correction by the feedback control exceeds a given degree.

2. The internal combustion engine according to claim 1, wherein:
    the second passage has first and second branch passages respectively connected to the intake passage; and
    the second flow change part is a check valve that is provided in the first branch passage and that allows gas to flow from the intake passage to the inside of the crankcase and inhibits another gas from flowing from the inside of the crankcase to the intake passage, and a flow rate adjustment valve that is provided in the second branch passage and changes a flow rate of gas flowing through the second branch passage.

3. The internal combustion engine according to claim 1, wherein the first flow change part is a flow adjustment valve that changes the flow rate of the gas passing through the first passage.

4. The internal combustion engine according to claim 2, wherein the first flow change part is a flow adjustment valve that changes the flow rate of the gas passing through the first passage.

5. An internal combustion engine comprising:
    a first flow change part that is provided in a first passage that interconnects an inside of a crankcase and a part of an intake passage located at a downstream side of an intake air amount adjustment part adjusting an intake air amount and changes gas flow in the first passage; and
    a second flow change part that is provided in a second passage that interconnects the inside of the crankcase and a part of the intake passage located at an upstream side of the intake air amount adjustment part and changes gas flow in the second passage, the second passage has first and second branch passages respectively connected to the intake passage,
    wherein if an engine temperature is higher than a given value, and a degree of fuel decreasing correction by a feedback control that controls a fuel injection amount exceeds a given degree, the first flow change part decreases a flow rate of gas passing through the first passage and the second flow change part restricts a gas flow direction in the second passage to a direction in which gas flows to the inside of the crankcase from the intake passage,
    wherein the second flow change part is a check valve that is provided in the first branch passage and that allows a gas to flow from the intake passage to the inside of the crankcase and inhibits another gas from flowing from the inside of the crankcase to the intake passage, and a flow rate adjustment valve that is provided in the second branch passage and changes a flow rate of a gas flowing through the second branch passage.

6. The internal combustion engine according to claim 5, wherein the first flow change part is a flow adjustment valve that changes the flow rate of the gas passing through the first passage.

* * * * *